(12) United States Patent
Poppe et al.

(10) Patent No.: US 10,016,781 B2
(45) Date of Patent: Jul. 10, 2018

(54) CAULKING GUN

(71) Applicant: Altachem NV, Harelbeke (BE)

(72) Inventors: Jean-Marie Poppe, Heule (BE);
Lieven Sichien, Ultbergen (BE)

(73) Assignee: Altachem NV, Harelbeke (BE)

( * ) Notice: Subject to any disclaimer, the term of this patent is extended or adjusted under 35 U.S.C. 154(b) by 0 days.

(21) Appl. No.: 15/306,834

(22) PCT Filed: Jun. 11, 2015

(86) PCT No.: PCT/EP2015/063084
§ 371 (c)(1),
(2) Date: Oct. 26, 2016

(87) PCT Pub. No.: WO2015/189341
PCT Pub. Date: Dec. 17, 2015

(65) Prior Publication Data
US 2017/0043367 A1 Feb. 16, 2017

(30) Foreign Application Priority Data
Jun. 12, 2014 (EP) .................................... 14172223

(51) Int. Cl.
*B05C 17/01* (2006.01)
*G01F 11/06* (2006.01)
(Continued)

(52) U.S. Cl.
CPC .... *B05C 17/0123* (2013.01); *B05C 17/00596* (2013.01); *B05C 17/0126* (2013.01);
(Continued)

(58) Field of Classification Search
CPC ............. B05C 17/012; B05C 17/0123; B05C 17/0126; B05C 17/014; B05C 17/0052;
(Continued)

(56) References Cited

U.S. PATENT DOCUMENTS 3,997,085 A * 12/1976 Lindquist ............ B05C 17/0123
222/326
4,009,804 A * 3/1977 Costa .................. B05C 17/0123
222/391
(Continued)

FOREIGN PATENT DOCUMENTS

EP 0 448 375 A1 9/1991
EP 1 892 045 B1 2/2008
(Continued)

OTHER PUBLICATIONS

International Search Report of PCT/EP2015/063084, dated Sep. 10, 2015.
(Continued)

*Primary Examiner* — Nicholas J Weiss
*Assistant Examiner* — Andrew P Bainbridge
(74) *Attorney, Agent, or Firm* — Collard & Roe, P.C.

(57) ABSTRACT

The present invention relates to a caulking gun for dispensing viscous material comprising
a stock
a cartridge keep
a push rod longitudinally moveably mounted in the stock provided at its one end with a plunger which engages the piston of a cartridge placed in the cartridge keep,
means for engaging the push rod to advance it,
brake means hinged to the stock and provided with a clearance hole for engaging the push rod such that the push rod is moveable in a direction advancing the push rod towards the cartridge and is held in a direction retreating the push rod from the cartridge, which brake means are arranged to travel to a first position relative to the stock as the push rod advances and to a second position as the push rod retreats thereby defining the retreat of the push rod, the brake means being inclined relative to the axis of the push rod and
adjusting means for varying the retreat of the push rod.

(Continued)

Figure 1:
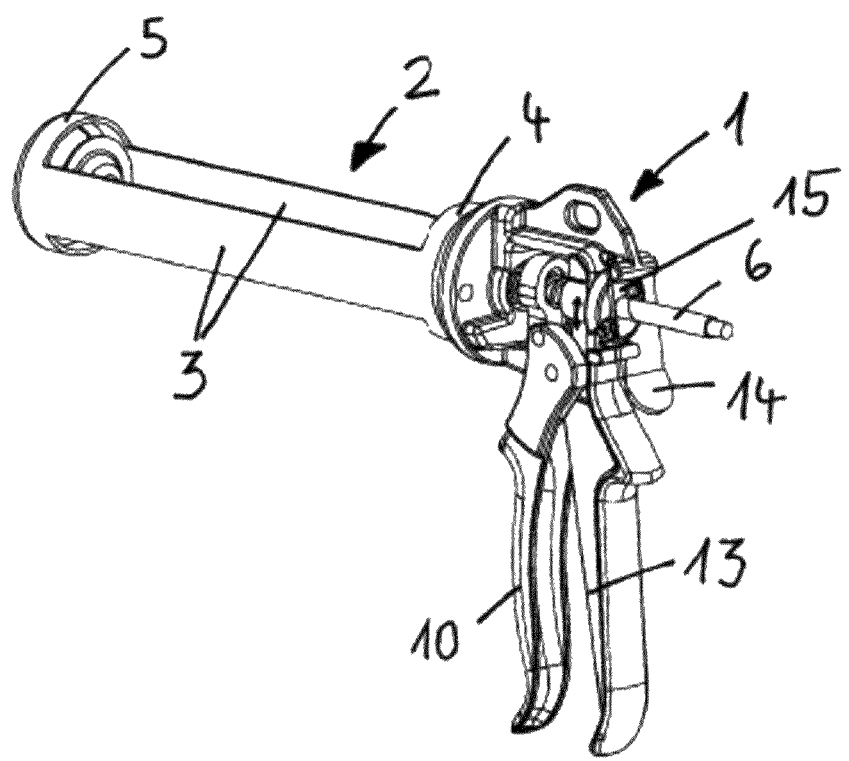

In order to provide an adjustable caulking gun with at least two different levels of retreat of the push rod giving the user easily a visual feedback of the chosen retreat of the push rod, it is proposed according to the present invention that the adjusting means are configured as a rotatable wheel with a slope, the rotatable wheel being positioned on the axis of the push rod between the stock and the brake means, the distance between the highest point of the slope and the brake means defining the retreat of the push rod.

This rotatable wheel allows the user to select the level of retreat of the push rod by turning the wheel between a first position with no retreat of the push rod and a second position with a maximum retreat of the push rod resulting in a anti-drip behavior of the caulking gun.

9 Claims, 7 Drawing Sheets

(51) Int. Cl.
B05C 17/005 (2006.01)
G01F 11/00 (2006.01)

(52) U.S. Cl.
CPC ........ *B05C 17/005* (2013.01); *B05C 17/0052* (2013.01); *B05C 17/01* (2013.01); *B05C 17/014* (2013.01); *B05C 17/0136* (2013.01); *G01F 11/00* (2013.01); *G01F 11/06* (2013.01)

(58) Field of Classification Search
CPC . B05C 17/00596; B05C 17/005; B05C 17/01; B05C 17/0136; G01F 11/06; G01F 11/00
USPC ... 222/391, 153.01, 325–327, 105, 108–111, 222/309, 386–386.5; 604/209; 74/169, 74/141.5, 148, 531
See application file for complete search history.

(56) References Cited

U.S. PATENT DOCUMENTS

| | | | | |
|---|---|---|---|---|
| 4,264,021 A | * | 4/1981 | Davis, Jr. | B05C 17/012 222/326 |
| 4,273,269 A | * | 6/1981 | Davis, Jr. | B05C 17/012 222/326 |
| 4,330,070 A | * | 5/1982 | Doubleday | G01F 11/023 222/287 |
| 4,681,524 A | | 7/1987 | Ikeda et al. | |
| 5,529,225 A | * | 6/1996 | Chang | B05C 17/01 222/391 |
| 5,615,807 A | * | 4/1997 | Peng | B05C 17/01 222/153.01 |
| 5,988,452 A | * | 11/1999 | Dent | A61M 5/204 222/309 |
| 6,089,412 A | * | 7/2000 | Snell | B05C 17/01 222/214 |
| 6,253,969 B1 | * | 7/2001 | Nelson | B05C 17/01 222/327 |
| 7,011,238 B1 | * | 3/2006 | Sung | B05C 17/0123 222/391 |
| 7,032,785 B1 | * | 4/2006 | Huang | B05C 17/0123 222/145.1 |
| 7,032,786 B1 | * | 4/2006 | Huang | B05C 17/0123 222/145.1 |
| 7,896,201 B2 | * | 3/2011 | Strobel-Schmidt | B05C 17/012 222/326 |
| 8,511,520 B2 | * | 8/2013 | Van Wijk | B05C 17/00576 222/287 |
| 8,857,673 B2 | * | 10/2014 | Szpak | B65D 83/0033 222/326 |
| 2012/0211527 A1 | * | 8/2012 | Strobel-Schmidt | B05C 17/0052 222/309 |
| 2012/0228334 A1 | * | 9/2012 | Van Wijk | B05C 17/0126 222/287 |
| 2013/0160621 A1 | | 6/2013 | Marsden et al. | |

FOREIGN PATENT DOCUMENTS

GB  1 555 455 A  11/1979
WO  99/37407 A1  7/1999

OTHER PUBLICATIONS

Written Opinion of International Preliminary Examining Authority in PCT/EP2015/063084, dated May 4, 2016.

\* cited by examiner

Fig. 3b
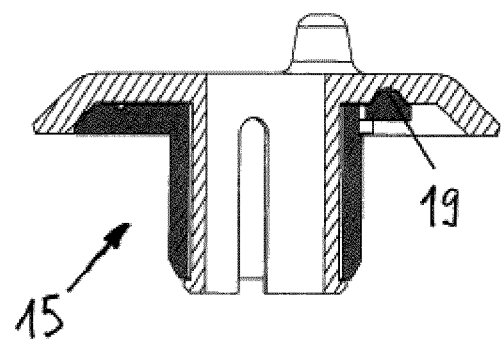
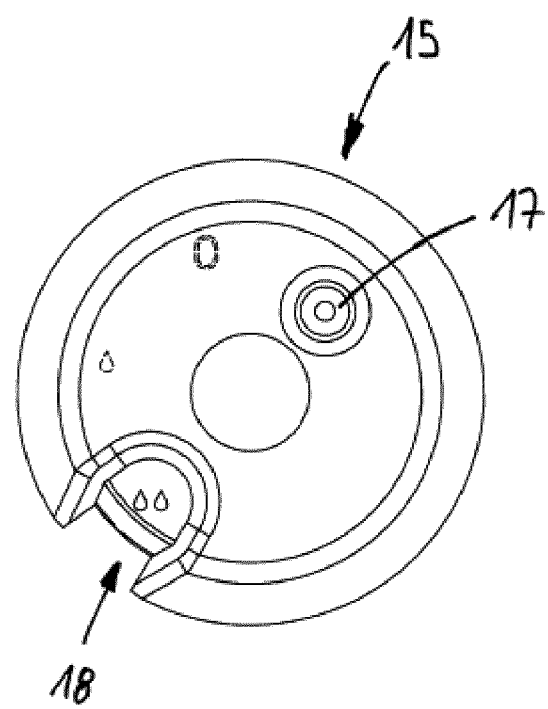
Fig. 3c

CAULKING GUN

CROSS REFERENCE TO RELATED APPLICATIONS

This application is the National Stage of PCT/EP2015/063084 filed on Jun. 11, 2015, which claims priority under 35 U.S.C. § 119 of European Application No. 14172223.1 filed on Jun. 12, 2014, the disclosure of which is incorporated by reference. The international application under PCT article 21(2) was published in English.

The present invention relates to a caulking gun for dispensing viscous material comprising
  a stock
  a cartridge keep
  a push rod longitudinally moveably mounted in the stock provided at its one end with a plunger which engages the piston of a cartridge placed in the cartridge keep,
  means for engaging the push rod to advance it,
  brake means hinged to the stock and provided with a clearance hole for engaging the push rod such that the push rod is moveable in a direction advancing the push rod towards the cartridge and is held in a direction retreating the push rod from the cartridge, which brake means are arranged to travel to a first position relative to the stock as the push rod advances and to a second position as the push rod retreats thereby defining the retreat of the push rod, the brake means being inclined relative to the axis of the push rod, and
  adjusting means arranged for varying the retreat of the push rod.

Viscous material, such as mastic caulking material or sealants, is commonly supplied in plastic cartridges having a discharge nozzle. The cartridge can be mounted in a caulking gun.

An example of such a caulking gun is described in GB 1 555 455. It has a plunger on a push rod slidably mounted in a stock. The cartridge is mounted in a keep before the plunger. The plunger is advanced by means of a gripper plate and a trigger assemble to force a piston, inside one end of the cartridge forward to urge the material from the nozzle at the other end. A brake or locking plate is also mounted on the rod. This prevents the advanced piston from retreating until a releasing force is applied to the locking plate. The trigger and gripper plate are reset at the end of a dispensing stroke, while the rod is held in position by the locking plate, and the dispensing force can then be reapplied.

By maintaining a constant force on the trigger, it is possible to exert a high degree of control over the rate of discharge of the mastic material. However, while the gun is entirely acceptable such as a dispensing tool for viscous material in most situations, it is sometimes desirable to stop the discharge immediately when the hand releases the trigger.

In effect, the body of the cartridge expands radially under a dispensing force. Similarly, if any pockets of gas are trapped in the cartridge, they will compress during discharge of the material and expand once the dispensing force is removed from the piston of the cartridge. The contracting cartridge and any expanding pockets of gas tend to cause continued dispensing of the material when it is not required unless the locking plate is released manually.

WO 99/37407 A1 discloses a dispensing gun for use with a cartridge, comprising a frame supporting a piston rod with one or more operating levers connected to the frame and acting on the piston rod. The dispensing gun includes a reversible ratchet mechanism carried on the piston rod and operated on by one or more operating levers for the reciprocal motion of the piston rod. The dispensing gun includes a restraining mechanism to prevent a retreating movement of the rod. The restraining mechanism is removably secured to the dispensing gun using a screw.

U.S. Pat. No. 4,681,524 A discloses a dispensing gun for the dispensing of viscous material from a cartridge in which the discharge of residual material following an application stroke is addressed by urging a locking plate to an engaging position by means of a spring to one side of the push rod. The opposite end of the locking plate is held loosely in an aperture formed in the stock. As the dispensing force is removed, the locking plate retreats within the confines of the aperture, easing the force on the rod exerted by the cartridge.

Another form of pressure release device in a dispensing gun is known from EP 0 448 375 A1, in which the locking plate is frictionally engaged with the push rod by, for example, an O ring such that it is carried by the rod between a released and an engaging relationship as the rod is respectively advanced and retreated. At the end of the dispensing stroke, the force exerted by the cartridge on the plunger results in a small retreating motion carrying the locking plate to its engaging relationship at which point further retreat of the push rod is stopped as the brake plate eventually engages. The resulting "lost motion" releases the pressure on the cartridge by backing off the rod by a small amount, bringing dispensing of the material to an abrupt end.

EP 1 892 045 B1 describes a dispensing apparatus for dispensing viscous material according to the preamble and wherein the adjusting means are mounted on the brake means and are slidable relative to the brake means to vary the retreat of the rod. This allows the user to choose between a non-oozing operation (pressure release on) and a continuous dispensing action (pressure release off) by providing means for reducing the lost motion of brake means such as a locking plate. In fact, there is a mode of operation in which the oozing effect due to the cartridge contraction and gas trapped in the cartridge is not necessarily a drawback and can even be exploited to an advantageous effect. It is possible to achieve a continuous flow of the dispensed material by priming the dispensing gun with a first trigger stroke and then maintaining the pressure on the cartridge by a repeated pumping action of the trigger such that the energy stored in the deformed cartridge and compressed gases in it leads to a continuous stream of dispensed material.

U.S. Pat. No. 5,615,807 A concerns a dripless caulking gun having a first unlocked position and a second locked position, a control surface in the locked position thereof restricting the rearward movement to a certain distance.

US 2013/0160621 A1 describes caulking gun having a tip cutter mechanism that is supported to the body of the caulking gun and that has a blade with a cutting edge which allows to cut the dispensing tip in order to adjust the amount of caulk material that is dispensed.

U.S. Pat. No. 7,011,238 B1 is concerned with a caulk dispensing gun with an adjusting device allowing to adjust the inclination of the actuating plate relative to the piston rod, to adjust a frictional engagement between the actuating plate and the piston rod, particularly after the piston rod and the actuating plate have been worn out after use.

The objective of the present invention is to provide an adjustable caulking gun with at least two different levels of retreat of the push rod giving the user easily a visual feedback of the chosen retreat of the push rod.

This objective is achieved in that the adjusting means are configured as a rotatable wheel with a slope, the rotatable wheel being positioned on the axis of the push rod between the stock and the brake means, the distance between the highest point of the slope and the brake means defining the retreat of the push rod.

This rotatable wheel on the axis of the push rod allows the user to select the level of retreat of the push rod by turning the wheel between a first position with no retreat of the push rod and a second position with a maximum retreat of the push rod resulting in an anti-drip behaviour of the caulking gun. The brake means are inclined relative to the axis of the push rod. When the highest point of the slope of the rotatable wheel is the closest to the hinge of the brake means, it is in permanent contact with the brake means so that no retreat of the push rod is possible. Upon turning the rotatable wheel, the distance between the highest point of the slope and the brake means can be increased so that the retreat of the push rod is also increased. When the highest point of the slope of the rotatable wheel is the most far away from the hinge of the brake means, the retreat is at its maximum.

In a first embodiment of the invention, the slope is a continuous slope decreasing from the highest point of the slope to the lowest point thereof.

This embodiment allows a continuous regulation of the retreat of the push rod.

A second embodiment of the invention is characterized in that the slope is in form of steps decreasing from the highest point of the slope to the lowest point thereof.

This allows a stepwise adjustment of the retreat of the push rod.

According to a third embodiment of the invention, the slope is configured as at least one knob on the rotatable wheel.

If there is only one knob on the rotatable wheel, the retreat of the push rod can be selected by turning the rotatable wheel. Thereby, the distance between the knob and the brake means is varied due to the inclination of the brake means, thus varying the retreat of the push rod.

In this context, the slope can be configured by a plurality of knobs on the rotatable wheel, the height of the knobs decreasing from one knob to the next one.

An improvement of the invention consists in the fact that the rotatable wheel is provided with a snap defining certain levels of retreat of the push rod.

Such a snap provides the user of the caulking gun with a haptic feedback on the selected adjustment of the retreat of the push rod. A snap can for example define three positions: No retreat, medium retreat and full retreat of the push rod.

In this context, the snap can be realized by an elastic protruding element entering into at least one cavity of the rotatable wheel.

This elastic protruding element can for example be configured as a ball pushed by a spring or an elastic element, both being able to enter into a cavity of the rotatable wheel. The cavity is preferably configured so that with a certain force, the elastic protruding element can be easily pushed out of the cavity when the wheel is turned to another position.

According to the number of snap positions, the rotatable wheel is provided with a corresponding number of cavities which are distributed around the wheel according to the selected snap positions.

In a further preferred embodiment of the invention, the rotatable wheel is provided with visual indicators of the selected retreat of the push rod.

In order to indicate the selected adjustment of the retreat, the current position can be read by the user from the rotatable wheel. The wheel can be provided with symbols or words indicating the different positions and a window can be provided for example in the brake means showing the current position.

Figure 2A:
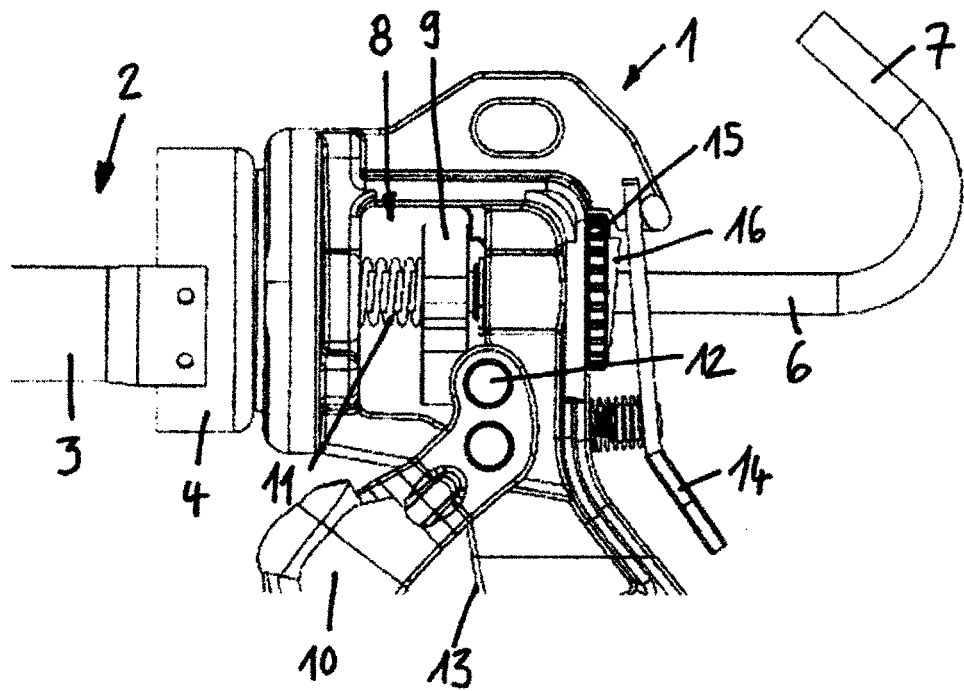
Figure 2B:
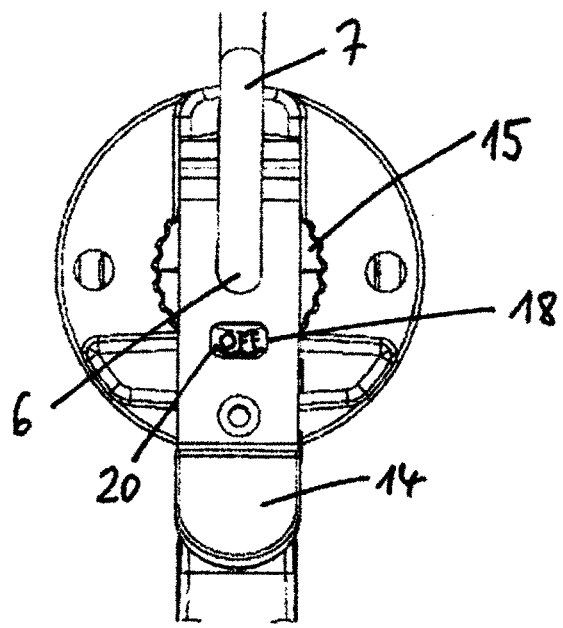
Figure 2C:
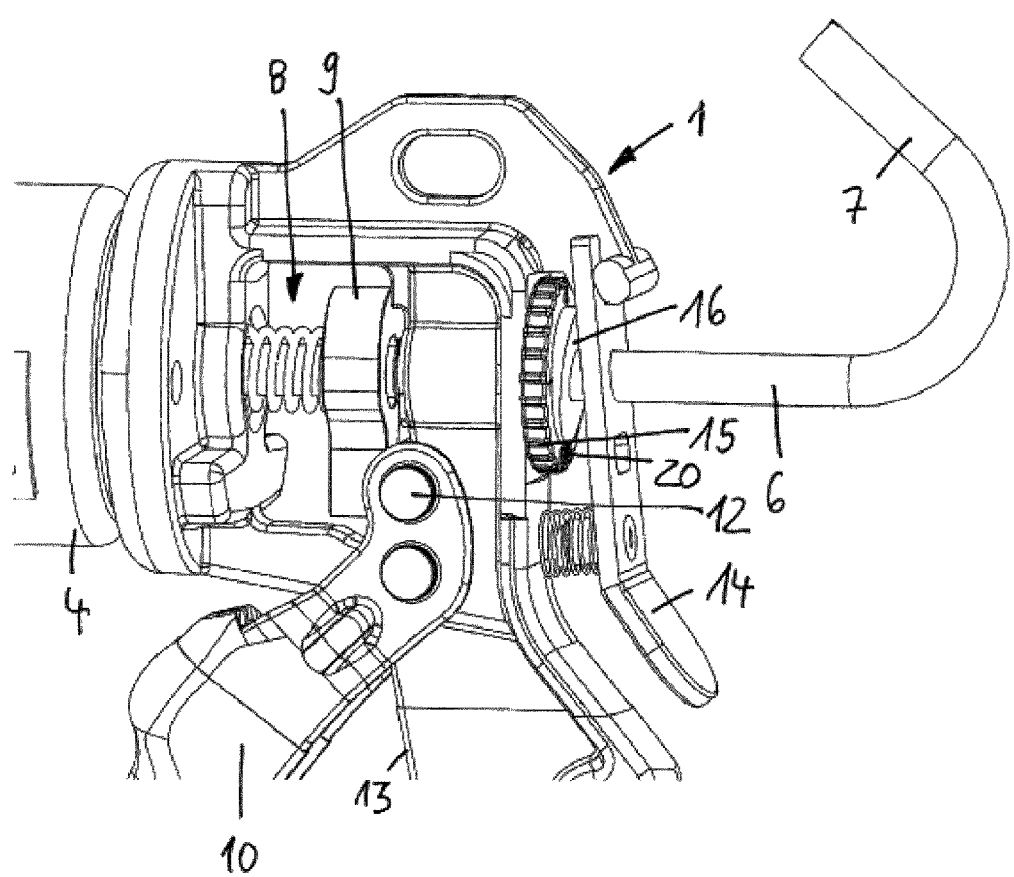
Figure 3A:
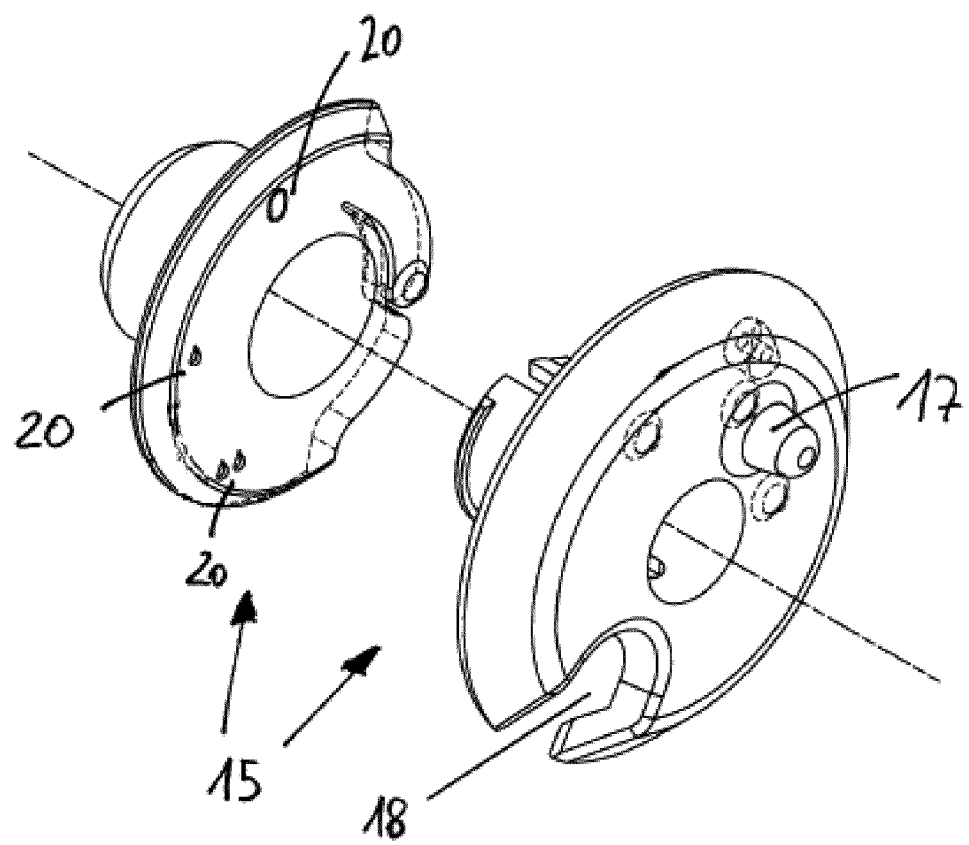
Figure 4A:
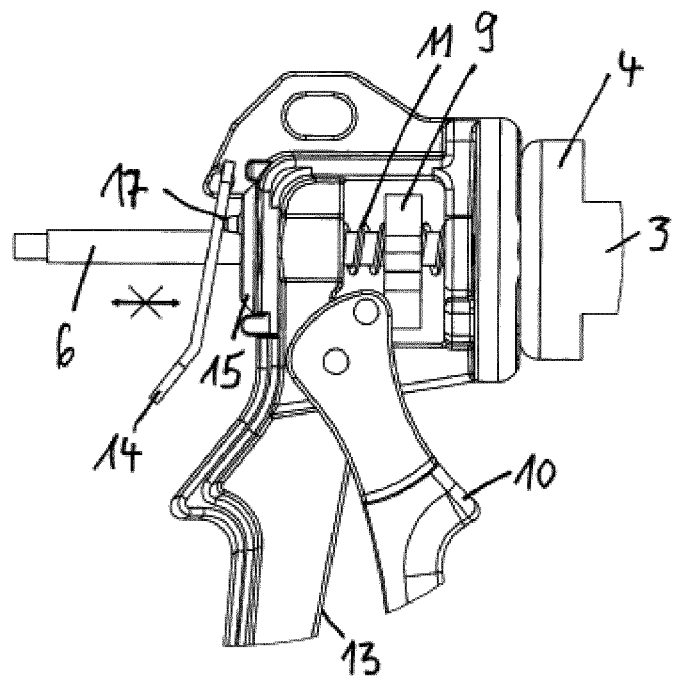
Figure 4B:
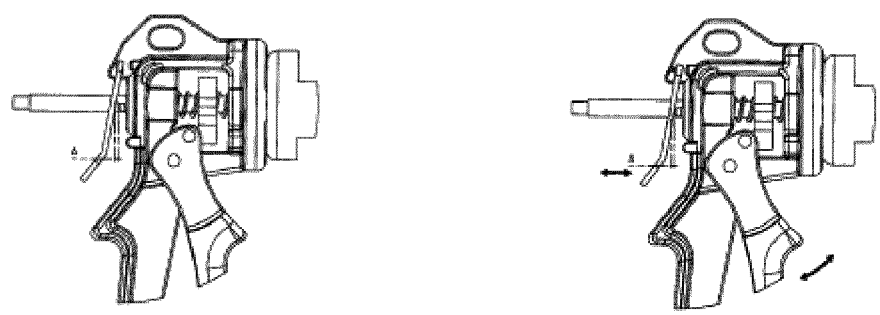
Figure 4C:
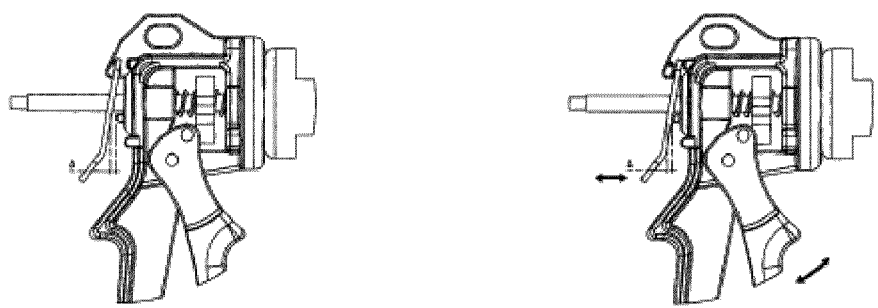

In the following, preferred embodiments of the present invention are shown with reference to the drawings in which FIG. 1 shows a perspective view of a caulking gun according to the present invention, FIGS. 2*a*, 2*b* and 2*c* show a first embodiment of the invention in a side view, a back view and a perspective view, FIGS. 3*a*, 3*b* and 3*c* show the configuration of the rotatable wheel of a second embodiment of the invention, FIGS. 4*a*, 4*b* and 4*c* show the different retreat positions of the caulking gun according to FIGS. 3*a*, 3*b* and 3*c*.

With reference to FIGS. 1 and 2*a*, the caulking gun comprises a stock 1 and a cartridge keep 2. The cartridge keep 2 of the shown example comprises two elongate parallel side frame members 3. One end of each frame member 3 merges with a generally cup-shaped rest 4 secured to the stock 1. The rest 4 bridges the frame members 3 in front of the stock 1. The rest 4 cooperates with the cup-shaped yoke member 5 to form a cradle to hold the cartridge in position.

The opposite ends of the frame members 3 are connected to an annular generally cup-shaped yoke member 5 having a large opening at its base.

A push rod 6 is mounted in the stock 1 for longitudinal movement in a direction parallel to and midway between the two frame members 3. At one end of the push rod 6 there is a plunger which engages the piston of the cartridge. The other end of the push rod 6 is formed as a hook 7 (FIG. 2*a*) by which the caulking gun may be suspended when it is not in use and which acts as a handle by which the push rod 6 may be moved longitudinally.

The stock 1 is formed with a large central transverse aperture 8. On either side of the aperture 8 there are guide holes which carry the push rod 6. The push rod 6 can be moved incrementally by a mechanism comprising a catch plate 9 in the aperture 8 having an opening through which the push rod 6 extends as a clearance fit.

The catch plate is pivotably held between flanks on a trigger 10 and is biased rearwards into an engaged attitude with the push rod 6 by means of a spring 11. The push rod 6 can be advanced by means of the trigger 10 pivoting about a point in the stock 1 defined by a rivet 12. The stock 1 has an integral butt portion 13 which extends downwardly and generally perpendicularly to the axis of the push rod 6. When the trigger 10 is squeezed, the butt portion 13 lies generally within the hollow of the shaped trigger 10.

Brake means 14 hinged to the stock 1 and provided with a clearance hole for engaging the push rod 6 such that the push rod 6 is moveable in a direction advancing the push rod 6 towards the cartridge and held in a direction retreating the push rod 6 from the cartridge are also provided. These brake means 14 are arranged to travel to a first position relative to the stock 1 as the push rod 6 advances and to a second position as the push rod 6 retreats thereby defining the retreat of the push rod 6, the brake means 14 being inclined relative to the axis of the push rod 6.

According to the invention, adjusting means 15, 16 are provided for varying the retreat of the push rod 6. These adjusting means are configured as a rotatable wheel 15 with a slope 16, the rotatable wheel 15 being positioned on the axis of the push rod 6 between the stock 1 and the brake means 14. The distance between the highest point of the slope 16 and the brake means 14 defines the retreat of the push rod 6.

In the embodiment of FIG. 2a to 2c, the slope 16 is a continuous slope 16 decreasing from the highest point of the slope 16 to the lowest point of the slope 16.

The rotatable wheel 15 with the slope 16 can be turned relative to the push rod 6 and allows the user to select the level of retreat of the push rod 6 by turning the wheel 15 between a first position with no retreat of the push rod 6 and a second position with a maximum retreat of the push rod 6 resulting in an anti-drip behaviour of the caulking gun. When the highest point of the slope 16 of the rotatable wheel 15 is the closest to the hinge of the brake means 14, it is in permanent contact with the brake means 14 so that no retreat of the push rod 6 is possible. Upon turning the rotatable wheel 15, the distance between the highest point of the slope 16 and the brake means 14 can be increased so that the retreat of the push rod 6 is also increased. When the highest point of the slope 16 of the rotatable wheel 15 is the most far away from the hinge of the brake means 14, the retreat is at its maximum.

As shown in FIGS. 2b and 2c, the rotatable wheel 15 is provided with visual indicators 20 of the selected retreat of the push rod and the brake means 14 are provided with a window 18 in which the selected retreat is indicated.

A second embodiment of the invention is shown in FIG. 3a to 3c. In this embodiment, the slope 16 is configured as one knob 17 on the rotatable wheel 15. When the knob 17 is closest to the hinge of the brake means 14, it is in permanent contact with the brake means 14 so that no retreat of the push rod 6 is possible. Upon turning the rotatable wheel 15, the distance between the knob 17 and the brake means 14 can be increased so that the retreat of the push rod 6 is also increased. When the knob 17 of the rotatable wheel 15 is the most faraway from the hinge of the brake means 14, the retreat is at its maximum.

In this second embodiment, the wheel 15 is made of a first part 15a and a second part 15b which are connected together. The first part 15a bears the knob 17 and a window 18. The second part 15b is provided with visual indicators 18 of the selected retreat of the push rod 6 in form of symbols and with an elastic protruding element 19 entering into at least one cavity of the first part 15a thereby forming a snap. The first part 15a is rotatable relative to the second part 15b which itself is fixed on the push rod 6. By turning the first part 15a relative to the second part from one snapping position to the next one, the retreat of the push rod 6 can be selected by the user.

The FIG. 4a to 4c show the different retreat positions of the caulking gun according to FIG. 3a to 3c.

In FIG. 4a, the knob 17 is at its highest position and in permanent contact with the brake means 14 so that no retreat is possible.

In FIG. 4a, the wheel 15 has been turned by about 90° so that the knob 17 is about half on the way between the highest position (the most close to the hinge of the brake means 14) and the lowest position (the most far from the hinge of the brake means 14) so that the retreat is medium.

FIG. 4c finally shows the position of the knob 17 when the wheel 15 has been turned by about 180°. In this position, a maximum of retreat is reached which allows assuring anti-drip of the caulking gun.

The invention claimed is:

1. Caulking gun for dispensing viscous material comprising
    a stock
    a cartridge keep
    a push rod having a first end, being longitudinally moveably mounted in the stock, and provided at the first end with a plunger which engages the piston of a cartridge placed in the cartridge keep,
    a block configured to engage the push rod to advance the push rod,
    a brake hinged to the stock and provided with a clearance hole for engaging the push rod such that the push rod is moveable in a direction advancing the push rod towards a cartridge in the cartridge keep and is held in a direction retreating the push rod from the cartridge, the brake being arranged to travel to a first position relative to the stock as the push rod advances and to a second position as the push rod retreats thereby defining the retreat of the push rod, the brake being inclined relative to an axis of the push rod, and
    an adjuster arranged for varying the retreat of the push rod,
    wherein the adjuster comprises a rotatable wheel with a slope, the rotatable wheel being positioned on the axis of the push rod between the stock and the brake, a distance between a highest point of the slope and the brake defining the retreat of the push rod, and
    wherein the slope is defined by at least one knob on the rotatable wheel.

2. Caulking gun according to claim 1, wherein the slope is a continuous slope decreasing from the highest point of the slope to the lowest point thereof.

3. Caulking gun according to claim 1, wherein the slope is defined by a plurality of knobs on the rotatable wheel, the height of the knobs decreasing from one knob to the next one.

4. Caulking gun according to claim 1, wherein the rotatable wheel is provided with visual indicators of the selected retreat of the push rod.

5. Caulking gun according to claim 1, wherein the block comprises a catch plate.

6. Caulking gun for dispensing viscous material comprising
    a stock
    a cartridge keep
    a push rod having a first end, being longitudinally moveably mounted in the stock, and provided at the first end with a plunger which engages the piston of a cartridge placed in the cartridge keep,
    a block configured to engage the push rod to advance the push rod,
    a brake hinged to the stock and provided with a clearance hole for engaging the push rod such that the push rod is moveable in a direction advancing the push rod towards a cartridge in the cartridge keep and is held in a direction retreating the push rod from the cartridge, the brake being arranged to travel to a first position relative to the stock as the push rod advances and to a second position as the push rod retreats thereby defining the retreat of the push rod, the brake being inclined relative to an axis of the push rod, and
    an adjuster arranged for varying the retreat of the push rod,
    wherein the adjuster comprises a rotatable wheel with a slope, the rotatable wheel being positioned on the axis of the push rod between the stock and the brake, a distance between a highest point of the slope and the brake defining the retreat of the push rod, and
    wherein the rotatable wheel is provided with at least one detent defining certain levels of retreat of the push rod.

7. Caulking gun according to claim 6, wherein the block comprises a catch plate.

8. Caulking gun according to claim 6, wherein the detent is realized as an elastic protruding element entering into at least one cavity of the rotatable wheel.

9. Caulking gun according to claim 8, wherein the rotatable wheel is provided with a corresponding number of cavities which are distributed around the rotatable wheel according to the selected detent positions.

* * * * *